United States Patent

Nagaoka et al.

[11] Patent Number: 6,048,069
[45] Date of Patent: Apr. 11, 2000

[54] WIDE ANGLE IMAGE-DISPLAYING SHEET AND SYSTEM

[75] Inventors: Yoshiyuki Nagaoka; Toshitaka Nakajima, both of Yamagata, Japan

[73] Assignee: 3M Innovative Properties Company, St. Paul, Minn.

[21] Appl. No.: 09/265,747

[22] Filed: Mar. 9, 1999

[51] Int. Cl.[7] .................................................. G02B 5/122
[52] U.S. Cl. ........................ 359/529; 359/515; 359/530
[58] Field of Search .......................... 359/515, 529–542, 359/546–553, 834, 837; 116/63 R, 63 P, 63 C; 404/9, 10, 16

[56] References Cited

U.S. PATENT DOCUMENTS

| | | |
|---|---|---|
| 4,025,159 | 5/1977 | McGrath . |
| 4,145,112 | 3/1979 | Crone et al. . |
| 4,605,461 | 8/1986 | Ogi . |
| 4,726,134 | 2/1988 | Woltman . |
| 4,758,469 | 7/1988 | Lange . |
| 5,050,327 | 9/1991 | Woltman . |
| 5,657,162 | 8/1997 | Nilsen et al. . |

FOREIGN PATENT DOCUMENTS

| | | |
|---|---|---|
| 53-46363 | 4/1978 | Japan . |
| 53-46371 | 4/1978 | Japan . |
| 55-65224 | 5/1980 | Japan . |
| 57-10102 | 1/1982 | Japan . |
| 57-193352 | 11/1982 | Japan . |
| 62-41804 | 10/1987 | Japan . |
| WO 96/04638 | 2/1996 | WIPO . |
| WO 97/01677 | 1/1997 | WIPO . |
| WO 97/01678 | 1/1997 | WIPO . |

*Primary Examiner*—James Phan
*Attorney, Agent, or Firm*—Stephen C. Jensen

[57] ABSTRACT

An imaging element is disposed on a front surface of a retroreflective sheeting to form an image-displaying sheeting. The imaging element includes a light-transmitting prismatic sheeting that has a surface provided with a plurality of parallel prisms. The imaging element also includes an adhesive layer that adheres the prismatic sheeting to the front surface of the retroreflective sheeting. At least a portion of the imaging element is shaped in the form of indicia. In some cases the prismatic sheeting itself is shaped in the form of indicia. In other cases the imaging element includes a light-transmitting colored layer disposed on the front surface of the retroreflective sheeting and shaped in the form of indicia. In the latter case, the prismatic sheeting can be shaped as before to match the indicia-shaped colored layer, or it can extend continuously across the entire retroreflective sheeting. A stationary light source can be added and suitably positioned to enhance visibility of the image in a viewing plane.

17 Claims, 3 Drawing Sheets

WIDE ANGLE IMAGE-DISPLAYING SHEET AND SYSTEM

CROSS REFERENCE TO RELATED APPLICATION

The present invention claims priority under 35 U.S.C. § 119 to Japanese Patent Application Serial No. 056643/1998, "Image-Displaying Sheet And Image-Displaying System", filed Mar. 9, 1998.

BACKGROUND

The present invention relates generally to sheeting used for signs and the like to convey information in the form of indicia. More particularly, the invention relates to such sheeting that is retroreflective.

The reader is directed to the glossary at the end of the specification for guidance on the meaning of certain terms used herein.

It is known to use retroreflective sheeting having an image thereon for image-displaying members of road signs, billboards, and the like. The retroreflective sheeting is generally either of the beaded variety or of the cube corner variety. Beaded sheeting utilizes miniature beads composed of glass or other transparent materials in connection with a reflective coating. Cube corner sheeting utilizes a microreplicated structured surface having a multitude of miniature reflective faces arranged in sets of three approximately mutually perpendicular faces, each such set of three faces referred to as a cube corner element. Except for certain pavement marker applications, such retroreflective sheeting is generally designed to have maximum retroreflective luminance for an entrance angle of about zero (0) degrees, i.e., for a light source located along an axis that is perpendicular to the sheeting. The retroreflective luminance then tends to decrease when the entrance angle exceeds a certain value.

When an image is formed on such sheeting by conventional methods, i.e., by providing a pigmented or otherwise colored layer on selected portions of the front surface of the retroreflective sheeting to form indicia, the visibility of the image deteriorates for illumination by light having a relatively high entrance angle. Thus, in order to realize good visibility of the image, the range of possible entrance angles of the light source tends to be limited. This makes it difficult to assemble a sign-displaying system so that a light source is placed near the edge of a sign surface (imaging surface) of a road sign for illuminating the sign.

Attempts have been made to enhance the retroreflective luminance of retroreflective sheeting at high entrance angles by forming an uneven front surface of the sheeting. Examples can be found in JP-A-53-46363 (Kuwata et al.), JP-A-53-46371 (Kuwata et al.), JP-A-55-65224 (Omori et al.), JP-A-57-10102 (Izutani), JP-A-57-193352 (Seki et al.), JP-Y-62-41804 (Okuno et al.), U.S. Pat. No. 4,605,461 (Ogi) and U.S. Pat. No. 4,758,469 (Lange), and PCT Publication Nos. WO97/01677 (Bacon et al.) and WO97/01678 (Bradshaw). The unevenness tends to improve retroreflectivity at high entrance angles. However, it is difficult to form an image with good visibility on the uneven front surface for forming image-displaying sheets. Also, the retroreflective luminance near zero (0) entrance angle tends to decrease.

U.S. Pat. No. 5,657,162 (Nilsen et al.) discloses a retroreflective sheeting comprising cube corner prismatic reflectors, a metallic reflective coating such as aluminum formed on only some of the prismatic surfaces, and a colored adhesive layer in contact with the rest of the prismatic surfaces. If the non-metallized surfaces were appropriately sized and configured, the adhesive layer could be made to form an image area visible from the front flat side of the retroreflective sheeting. Although the areas other than the image area could be seen at a higher luminance than the image area for light incident at a relatively low entrance angle, it is difficult to increase the visibility of the image area since it only reflects diffusely.

Retroreflective image-displaying sheets (e.g. for signs) are known, wherein a first retroreflective sheet forms the background and a second retroreflective sheet forms the image or indicia region. See, for example, U.S. Pat. No. 4,726,134 (Woltman) and U.S. Pat. No. 5,050,327 (Woltman). The two different types of sheets—one for the background, one for the image portion—have different retroreflective luminance properties as a function of entrance angle, and thus the visibility can be increased in a wider incident angle range than when only one retroreflective sheet is used. However, due to limitations of both types of sheeting at high entrance angles, the luminance cannot be increased in the relatively high entrance angle range (e.g., 70° or more), and thus the visibility tends to deteriorate in such a high incident angle range.

U.S. Pat. No. 4,025,159 (McGrath) discloses a combination cube corner/exposed bead lens product. Reportedly, such combination products have improved retroreflective performance at large entrance angles at which the retroreflectivity of simple cube-corner sheeting normally falls off rapidly. Further, the smooth front surface is compatible with formation of an image layer by the conventional methods discussed above. However, such sheeting increases the luminance across the entire front surface of the sheeting, and does not improve the visibility of the image by formation of an effective difference between the retroreflective luminance of the imaging part (i.e. the indicia such as characters, designs, and areas having characters or designs) and the retroreflective luminance of the background area so as to enhance contrast of the viewed image.

If the McGrath sheeting mentioned above is used only for indicia in a construction such as Woltman '134, the contrast of the image can be increased, but achieving sufficient luminance in the high entrance angle range remains difficult.

A need exists in the retroreflective sheeting art for an image-displaying sheet and system that has good contrast between the indicia portion and the background portion, that would avoid the characteristic decrease of retroreflective luminance at high entrance angles (typically at least 70°), and that would have improved visibility of the image for light incident at such high entrance angles.

BRIEF SUMMARY

Image-displaying sheeting is disclosed which comprises a retroreflective sheeting and an imaging element disposed on a front surface of the sheeting. The imaging element includes a light-transmitting prismatic sheeting that has a surface provided with a plurality of parallel prisms. The imaging element also includes an adhesive layer that adheres the prismatic sheeting to the front surface of the retroreflective sheeting. Significantly, at least a portion of the imaging element is shaped in the form of indicia.

In some embodiments, the prismatic sheeting itself is shaped in the form of indicia. In other embodiments, the imaging element includes a light-transmitting colored layer disposed on the front surface of the retroreflective sheeting and shaped in the form of indicia. In the latter case, the prismatic sheeting can be shaped as before to match the indicia-shaped colored layer, or it can extend continuously across the entire retroreflective sheeting. Further, the prismatic sheeting typically has a flat surface opposite the surface provided with the plurality of parallel prisms. Either the flat surface or the prismatic surface of the prismatic sheeting can contact the adhesive layer.

Also disclosed is an image-displaying system comprising the image-displaying sheeting discussed above, and a stationary light source disposed to improve the visibility of the image. The range of positions for the light source most effective in enhancing the contrast between the indicia and the background is dependent on the orientation of the prismatic sheeting.

Figure 1:
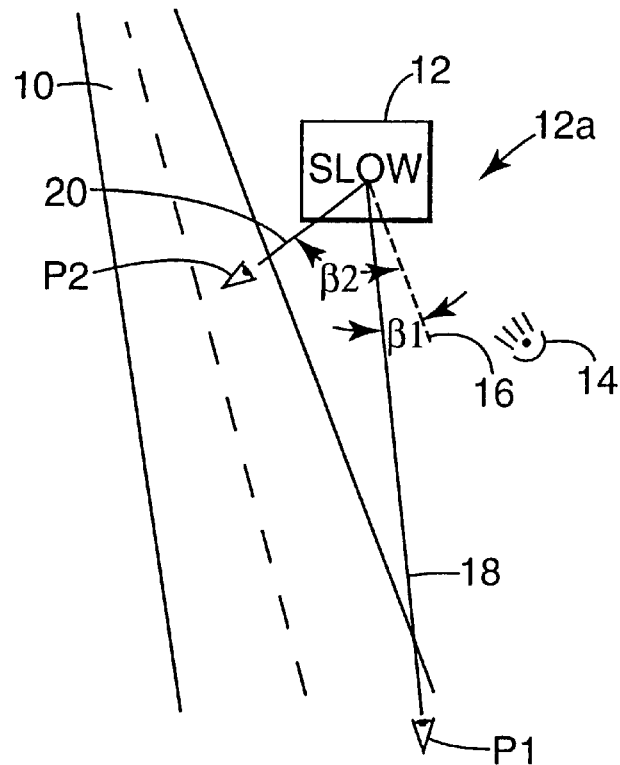
FIG. 1 is a perspective view of an example of an image-displaying sheeting and system.

In the drawings, the same reference symbol is used for convenience to indicate elements that are the same or that perform the same or a similar function.

DETAILED DESCRIPTION OF THE ILLUSTRATIVE EMBODIMENTS

FIG. 1 shows in perspective view a roadway 10 along which an image-displaying sheeting 12 is provided for viewing by motorists traveling along the roadway 10. The sheeting 12 is mounted to a rigid backing to form a sign. Sheeting 12 is also part of an image-displaying system 12a which further includes an appropriately positioned stationary light source 14.

Approaching the sign from far away, an observer traveling in a headlamp-equipped vehicle will initially view the sheeting from a position P1 that has a small entrance angle β1 between a reference axis 16 normal to the sheeting and an illumination axis 18. (No separate observation axis is shown in FIG. 1 because of the close proximity of the observer to the vehicle headlamp. The observation angle is usually less than 1°, and typically is taken to be 0.2°) Afterwards, the observer has moved to a position P2 that has a much larger entrance angle β2, at least 70°, between reference axis 16 and a new illumination axis 20. According to one aspect of the invention, the sheeting 12 is constructed in such a way that good retroreflective luminance is exhibited both at the small entrance angles and at the large entrance angles, and good contrast is achieved at those positions between the indicia that form the image and the background of the sheeting.

Figure 2:
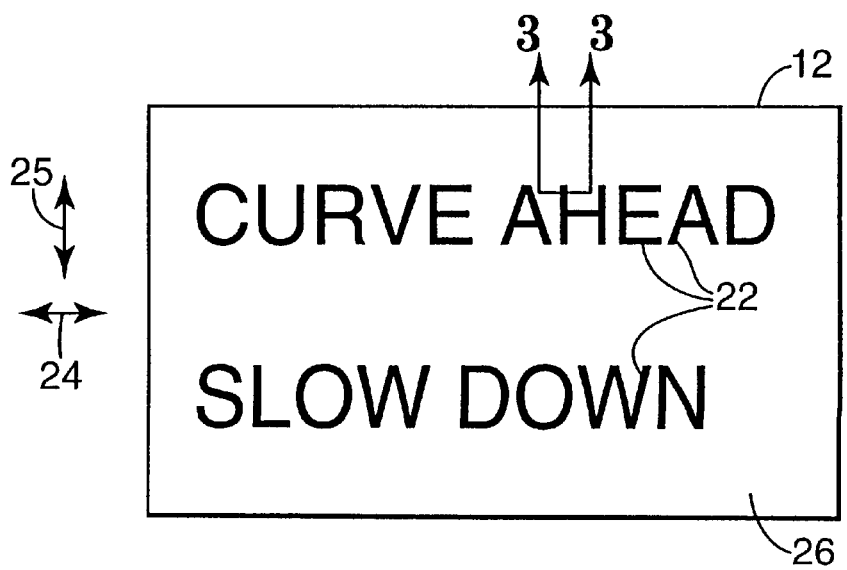
FIG. 2 is a front view of an image-displaying sheeting according to the invention.

The image-displaying sheeting 12 is shown in greater detail in FIG. 2. Sheeting 12 has indicia 22 that form an image, which in this example are the words "Curve Ahead, Slow Down", but can also be graphics, symbols, and the like. The indicia 22 are arranged on sheeting 12 along a legend axis 24. In the intended end use application, the sheeting is mounted such that the legend axis 24 has a predetermined orientation with respect to observers. The indicia can be distinguished from background portions 26 of sheeting 12. However, both the indicia 22 and the background 26 are retroreflective at least at certain entrance angle ranges.

Sheeting 12 comprises a retroreflective sheeting having a smooth front surface and an imaging element disposed on the front surface. In order to achieve retroreflectivity at high entrance angles, the imaging element includes a light-transmitting prismatic sheeting having a surface provided with a plurality of parallel prisms. The imaging element also includes an adhesive layer that adheres the prismatic sheeting to the front surface of the retroreflective sheeting. In some embodiments, the imaging element also includes a light-transmitting colored layer. Details of the various embodiments are discussed below. However, in each embodiment at least a portion of the imaging element is shaped in the form of indicia.

The sectional view along line 3—3 in FIG. 2 is shown for various disclosed embodiments in FIGS. 3a–e. These embodiments each include a retroreflective sheeting 28 which can comprise any conventional retroreflective sheeting material, whether of the beaded variety (including encapsulated exposed lens constructions where a cover sheet maintains an air interface with upper portions of the beads, and embedded lens constructions where upper portions of the beads are embedded in a polymeric layer) or the cube corner variety (including constructions that provide an air interface for the cube corner elements and constructions that provide a metallic vapor coat on the cube corner elements). Sheeting 28 has a front surface 29 that is relatively flat to facilitate easy printing, coating, or bonding thereto. The differences between the embodiments of FIGS. 3a–e relate to the particular kind of imaging element used.

Figure 3A:
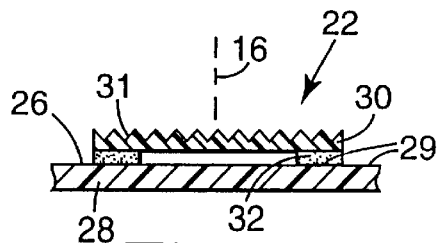
FIGS. 3a–e are sectional views along line 3—3 in FIG. 2 for various disclosed embodiments.

In the embodiment of FIG. 3a, the imaging element comprises a light-transmitting prismatic sheeting 30 and an adhesive layer 32. Sheeting 30 has a prismatic surface 31 of parallel prisms that extend parallel to axis 25 shown in FIG. 2. Axis 25 is perpendicular to axis 24, and is also perpendicular to a "viewing plane", i.e., a plane where observers are generally expected to be located (in FIG. 1, the plane containing reference axis 16 and parallel to roadway 10 can be considered a viewing plane). Prismatic sheeting 30 has the effect of modifying the direction of a light beam that is incident in the viewing plane (or, for light not incident in the viewing plane, the component of such a light beam in the viewing plane). When light from a given direction is incident on the sheeting, the portion impinging on sheeting 30 is bent, then retroreflected by sheeting 28, and then bent back such that it returns to the light source. The portion of the incident light impinging on background portions 26 is simply retroreflected by sheeting 28 back towards the light source.

Sheeting 30 has the effect of converting light having a low angle of incidence to light having a high angle of incidence, and vice versa. Since the sheeting 28 has a retroreflective luminance that changes as a function of entrance angle, this property of prismatic sheeting 30 has the ability to increase or decrease the perceived retroreflective luminance of the portion of sheeting 28 covered by prismatic sheeting 30. This in turn provides an image that can be clearly seen due to the good contrast between background 26 and indicia 22 portions of the sheeting, at least at low and high angles of incidence. As an example, light that is incident parallel to reference axis 16 (having a zero degree entrance angle) is returned to the light source with maximum retroreflective luminance by background portions 26, for most types of retroreflective sheeting 28. However, portions of this zero entrance angle light impinging on indicia 22 is returned to the light source with a much lower retroreflective luminance because it strikes sheeting 28 at a high entrance angle.

Adhesive layer 32 in the embodiment of FIG. 3a is discontinuous. It comprises a narrow strip that follows the border of the indicia 22, leaving an open space in the central portions. The adhesive layer 32 is preferably transparent so that substantially the entire indicia 22, not just the central portions thereof, is retroreflective.

Figure 3B:
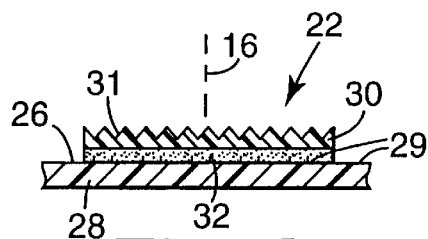

FIG. 3b shows an embodiment similar to that of FIG. 3a, except that in FIG. 3b the adhesive layer 32 is continuous, i.e., unbroken and coextensive with the prismatic sheeting 30. As long as the adhesive is sufficiently transparent, the embodiment of FIG. 3b enhances the brightness of indicia 22 somewhat by eliminating two air interfaces associated with the open space in FIG. 3a.

Figure 3C:
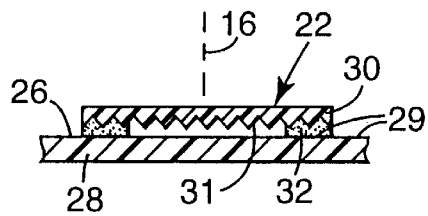

FIG. 3c also shows an embodiment similar to that of FIG. 3a, except that the prismatic film 30 is turned over so that the prismatic surface 31 faces downward toward sheeting 28. The flat surface opposite prismatic surface 31 faces upward. An advantage of this is that the precision prismatic surface 31 is protected from dirt, abrasion, and other harmful influences. In this orientation, prismatic film 30 also has the effect of bending incident light so as to produce good contrast between indicia 22 and background portions 26. Differences do exist however between the operation of film 30 in the two different orientations. For example, the prismatic-side-up orientation of FIGS. 3a–b has transmits light incident at entrance angles near 90° (for example 87°) better than the prismatic-side-down orientation of FIG. 3c. As another example, depending upon details of the prism geometry and the presence of an air interface, the prismatic-side-down orientation can cause zero entrance angle light to be retroreflected directly from surface 31 rather than being transmitted to sheeting 28.

Figure 3D:
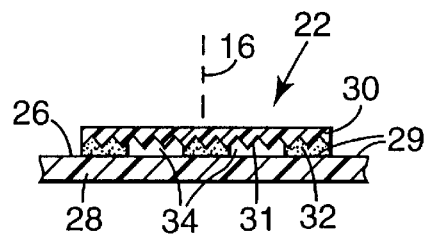

FIG. 3d shows an embodiment similar to that of FIG. 3c, except that the adhesive layer 32 is not only discontinuous but also arranged in a regular pattern to form a regular array of open spaces 34. The pattern can be made small enough so that it is not discernable at normal viewing distances and conditions. For discontinuous adhesive layers, the adhered area between the front surface 29 and the prismatic film 30 is usually between 30 and 80%. Thus, open spaces 34 usually take up about 20 to 70% of the area of prismatic sheeting 30 when seen in plan view.

In the image-displaying sheetings shown in FIGS. 3a–d, the shape of the prismatic sheeting itself represents the image. The background becomes bright, while the imaging element becomes relatively dark, in the low entrance angle range. In the high entrance angle range near 90°, the imaging element becomes bright and the background becomes relatively dark. Retroreflectivity of the sheeting is maintained at both low and high entrance angles, and the image can be clearly seen due to the good contrast with the background. It should be noted that an intermediate range of entrance angles exist where the brightness of the background and that of the imaging element become comparable. In this intermediate range, the contrast attributable to differences in retroreflective luminance deteriorates. However, it is possible to select appropriate retroreflective sheetings and prismatic sheetings such that in the intermediate entrance angle range, both the imaging element and the background portion still have relatively high retroreflective luminance so that the image is visible, even though it may not have good contrast with the background.

Figure 3E:
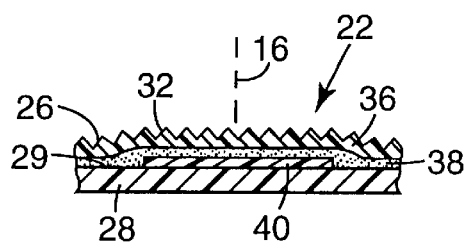

In FIG. 3e, an embodiment is shown where the imaging element includes a prismatic film 36 (similar to previously discussed film 30) having a prismatic surface 37 configured in the same way as surface 31, a continuous adhesive layer 38 (similar to the continuous adhesive layer 32 shown in FIG. 3b), and a light-transmitting colored layer 40 shaped in the form of indicia 22. The colored layer 40 can be formed, for example, by printing an image such as a group of characters with conventional light-transmitting inks. The prismatic sheeting 36 extends continuously to cover both the indicia portions 22 and the background portions 26. The sheeting 36, due to its light bending capability, improves retroreflective luminance for both of these portions equally for high entrance angles (usually at least 70°), thus improving visibility of the image. The image remains visible at low entrance angles, although its visibility is degraded compared with a conventional image-displaying sheeting because of the reduction in retroreflective luminance for both indicia 22 and background 26.

The prismatic sheeting 36 can if desired cover the entire image-displaying sheeting 12. Alternatively, sheeting 36 can cover only a portion of sheeting 12 and have a shape different from indicia 22 (for example, a rectangle, circle, or ellipse) to produce a contrasting effect between parts of the image covered by the prismatic sheeting and background portions not covered. In another alternative, the prismatic sheeting 36 can be cut to have an identical shape to colored layer 40 (stated differently, colored layer 40 can be added to the embodiment of FIG. 3b). This last-mentioned embodiment again has good contrast between image and background at low entrance angles. It also provides good visibility of the image even at the intermediate entrance angles due to the presence of the colored indicia.

In still other embodiments, any two (or more) of the above image-displaying sheeting embodiments can be used on the same retroreflective sheeting. For example, when the sheeting has an image comprising two different kinds of imaging elements formed on the same retroreflective sheeting, it is possible to allow only one of them to be seen clearly under a desired entrance angle condition. By using prismatic sheetings that have different refractive characteristics, one set of indicia associated with one such sheeting can be seen with high luminance in a low entrance angle range, while the other set of indicia associated with the other such prismatic sheeting can be seen with high luminance in the high entrance angle range. Ways to produce prismatic sheetings having different refractive characteristics include turning the sheeting over (one prismatic surface facing up, one facing down) or changing the shapes, sizes, or distances of the parallel prisms.

As an example, a combination image-displaying sheeting can be assembled by placing a first imaging element, with a prismatic sheeting having the prismatic surface facing up, and a second imaging element, with a prismatic sheeting having the prismatic surface facing down, on the same front surface of a retroreflective sheeting. The first element is seen more clearly than the second for entrance angles from 0 to 10° and from 70° and higher, and the second element is seen more clearly for entrance angles from about 25 to 65°. A light source can also be added to form an image-displaying system as discussed below.

Discussion

Prismatic sheetings useable with the invention include those having one flat surface and an opposed surface that carries a plurality of parallel prisms. Such a sheeting is usually made of a light-transmitting polymer. The prisms are typically arranged parallel to each other on a prism plane. Each prism is generally triangular in shape, with the base of the triangle being parallel to the typically flat surface of the prismatic sheeting opposite the prismatic surface. In the embodiments of FIGS. 3a–e the base of each triangle is not visible because the prisms and the remainder of the prismatic sheeting form a unitary member.

For parallel triangular prisms, the two sides of the triangle other than the base mentioned above have an included angle typically between about 70° and 110°, and preferably between 80° and 100°. In this range of included angle, good high entrance angle performance can be achieved. Examples of prismatic sheetings satisfying this condition are optical films known in the art as optical lighting films, light directing films, brightness enhancement films, and the like. Many such films have been sold by Minnesota Mining and Manufacturing Company, under the designations "SOLF", "TRAF" and "BEF".

Cross-sectional prism shapes other than triangles can be used. For example, each prism can have a rectangular shape one ridge of which is rounded. Also, one side of the prism can be an arc or an ellipsoidal arc rather than straight. "Parallel prisms" however do not generally mean a conventional cube corner prism array formed by three intersecting sets of parallel grooves.

On the prismatic surface, the pitch of the prisms (i.e. the distance between vertices of adjacent prisms) is usually from about 20 to about 1000 μm, and the height of the prisms (i.e., the distance from the prism vertex to the prism base) is usually from about 20 to about 3000 μm. The thickness of the prism sheet (the distance from the highest prism vertex to the flat surface) is usually from about 0.1 to about 3 mm.

A wide variety of different adhesives are useable in the adhesive layer. A particularly useful example is an acrylic adhesive having a thickness of between 1 and 200 μm.

The adhesive can contain various additives to give desired visual or mechanical properties. For embodiments shown in FIGS. 3a–d, one or more fluorescent dyes can be added to improve the visibility of the image in the daytime or at twilight. Such dyes are preferably perylene type fluorescent dyes because of their good weathering resistance, thus preventing discoloration of the image when the image-displaying sheeting is used outdoors. The amount of fluorescent dye used is usually between 0.1 and 5 wt. parts per 100 wt. parts of the adhesive. If the amount of fluorescent dye is too small, the visibility of the image may suffer from insufficient color development. If the amount is too large, the compatibility of the dyes with the adhesive or the solution of the adhesive decreases, and the appearance of the sheeting tends to be spoiled.

The adhesive typically transmits light, usually at least 60%. However, the adhesive may be opaque if it is discontinuous, i.e., only partially adhered to the retroreflective sheet or colored layer.

Permissible candidates for use in the colored layer include any conventional light-transmitting ink, which typically have a light transmission of from 3% to 90%. In this context, light transmission means the optical transmission measured with a suitably configured spectrophotometer using light at 550 nm or some other design wavelength if desired. The light-transmitting inks include binders and coloring materials. Examples of binders are acrylic resins, vinyl chloride resins, vinyl chloride-vinyl acetate resins, polyesters, and the like. Examples of coloring materials are inorganic pigments, processed pigments comprising pigments dispersed in resins such as vinyl chloride resins, vinyl chloride-vinyl acetate resins, etc., dyes such as fluorescent dyes, and the like.

The colored layer can be formed by conventional printing methods such as screen printing, gravure printing, or the like, or conventional coating methods such as roll coating, bar coating, etc. Alternatively, the colored layer can be formed by adhering a light-transmitting colored adhesive sheet which has been cut in a desired shape, and adhering it to the surface of the retroreflective sheeting. The thickness of the colored layer is usually between about 1 and 100 μm. It is noted that in embodiments where the colored layer is covered by the prismatic sheeting, damage to images formed by the colored layer from environmental causes such as wind, rain, etc. is avoided, even when the sheeting is used outdoors.

In forming the imaging element, in many of the embodiments a prismatic sheeting with an adhesive layer is provided, and adhered to the front of the retroreflective sheeting. The prismatic sheeting with the adhesive layer can be prepared by coating an adhesive solution on a separator (a release paper) and dried to form an adhesive layer, and laminating a prismatic sheeting on the adhesive layer. Alternatively, an adhesive layer is formed on the front of the retroreflective sheeting, and then a prismatic sheeting is provided on the adhesive layer.

The planar dimension of any of the imaging elements disclosed herein is not limited. For example, when a group or row of characters is used as an image, a planar size of each character may be within a square of 10 cm×10 cm to 1 m×1 m. A symbol, figure, or graphic can have similar in-plane dimensions.

Image-Displaying System

For the image-displaying sheeting constructions discussed above, it is implicit that the observer is positioned close to an accompanying light source, and the observer and the light source move together in unison. For example, the observer may be a driver of a vehicle and the light source is a headlamp on the vehicle. Or, the observer may be a pedestrian who is holding a flashlight (torch). In either case the angular separation between the observer and the light source, as viewed from the image-displaying sheeting, remains small.

Surprisingly, it has been found that by providing a suitable stationary light source, appropriately positioned, the contrast of the image for the above-described image-displaying sheetings can be enhanced even for observers who are not positioned close to the illumination axis between the stationary light source and the sheeting. Ordinarily one would expect that most of the light from the stationary light source returns to that light source, or the immediate vicinity thereof.

The type of light source used in the image-displaying system is not limited, insofar as it can illuminate the surface of the image-displaying sheet under the conditions described herein. For example, lighting equipment having a floodlight such as a spotlight or searchlight can be used. Furthermore, an automobile headlamp suitably mounted can be used. The light-emitting member can include incandescent lamps, halogen lamps, fluorescent lamps, metal halide lamps, xenon lamps, sodium lamps, and the like. The stationary light source desirably provides an illumination intensity from about 10 to 400 lux as measured at the image-displaying sheeting. The distance between the source and the sheeting is usually from about 3 to 50 m, and preferably from about 5 to 25 m.

The stationary light source is positioned close to the viewing plane referred to above, preferably within about 20° on either side of that plane. Further, the entrance angle of the light emitted from the light source is from 10 to less than 90°. Within these angular constraints, the visibility of the image can be improved for observers in or near the viewing plane.

More preferably, for embodiments utilizing prismatic sheeting with the prismatic surface facing upward (away from the retroreflective sheeting), for example FIGS. 3a, 3b, and 3e, the entrance angle is preferably from about 20 to 80 degrees. In this range, the contrast between the image (indicia 22) and the background portions 26 can be particularly easily increased. This is helpful to eliminate zones referred to above where the perceived contrast between the image and background is low.

For embodiments utilizing prismatic sheeting with the prismatic surface facing downward (towards the retroreflective sheeting), for example FIGS. 3c and 3d, the entrance angle is preferably from about 60° to less than 90°, and more preferably from about 70° to 87°. Again, this angular range yields an image seen as bright with high luminance, and high contrast with the background.

The image-displaying systems can be used as road signs, billboards, and variable image-displaying members. Also they can be used as eye-guiding signs on curved guardrails or in tunnels. When the image-displaying sheeting is used as a road sign erected on the side of the roadway or as eye-guiding signs, the prismatic sheeting is configured so that the prisms extend along a prism axis substantially perpendicular to the road surface.

EXAMPLES

Several examples were constructed to demonstrate the operation of the invention. Table 1 below summarizes the type of retroreflective sheeting used in each of the examples. Table 2 below summarizes details of the construction of the imaging elements used.

TABLE 1

Retroreflective Sheeting Portion

| Example | Beaded, enclosed lens (3M type 580-10) | Beaded, encapsulated lens (3M type 3870) | Cube Corner (3M type 3990) |
|---|---|---|---|
| Ref(A & B) | | | X |
| 1, 2 | X | | |
| 3 | | X | |
| 4 | | | X |
| 5, 6 | X | | |
| 7 | | X | |
| 8 | | | X |
| 9(A & B) | X | | |
| 10(A & B) | | X | |
| 11(A & B) | | | X |
| 12(A & B) | X | | |
| 13(A & B) | | X | |
| 14(A & B) | | | X |
| 15, 16, 17 (A & B) | X | | |

TABLE 2

| | Imaging Element Portion | | | | | | |
|---|---|---|---|---|---|---|---|
| | Prismatic Sheeting | | | Adhesive Layer | | | Colored Layer |
| Example | Prisms Up | Prisms Down | Indicia-shaped | Continuous | Discontinuous | Red dye | (Indicia-shaped) |
| Ref(A) | X | | | | | X | |
| Ref(B) | | X | | | | X | |
| 1, 3, 4 | X | | X | X | | | |
| 2 | X | | X | X | | X | |
| 5, 7, 8 | | | X | X | | X | |
| 6 | | | X | X | | X | X |
| 9–11(A) | X | | | X | X | | X |
| 9–11(B) | | X | X | X | | | |
| 12–14(A) | X | | | | X | | X |
| 12–14(B) | | X | | | X | | X |
| 15 | X | | | | X | | X |
| 16 | X | | X | X | | | X |
| 17(A) | X | | X | X | | | X |
| 17(B) | | X | | | X | | |

Reference Example

For the reference example, two imaging elements were placed on the retroreflective sheeting. The imaging element A was prepared by adhering four pieces of double-coated adhesive tape (type VHB available from 3M Company, thickness of 1.1 mm and width of 25 mm) to the respective four corners of the flat surface of a 15 cm×15 cm square piece of prismatic sheeting. The other imaging element ("B") was prepared by adhering four similar pieces of the same type of tape to the respective four corners of the prismatic surface of another 15 cm×15 cm square piece of prismatic sheeting. The two imaging elements were then adhered to the front surface of the retroreflective sheeting, keeping the prism axis of the two pieces of prismatic sheeting substantially parallel to each other. The adhesive layer, about 40 μm thick, had a light transmission of about 85%.

The prismatic sheeting used in this and in the other examples was the type known as "SOLF" (Scotch™ Optical Lighting Film) offered at one time by 3M Company. Each prism on the prismatic surface had an included angle between the two exposed facets of about 90°, and the prism pitch was about 360 μm.

Figure 4:
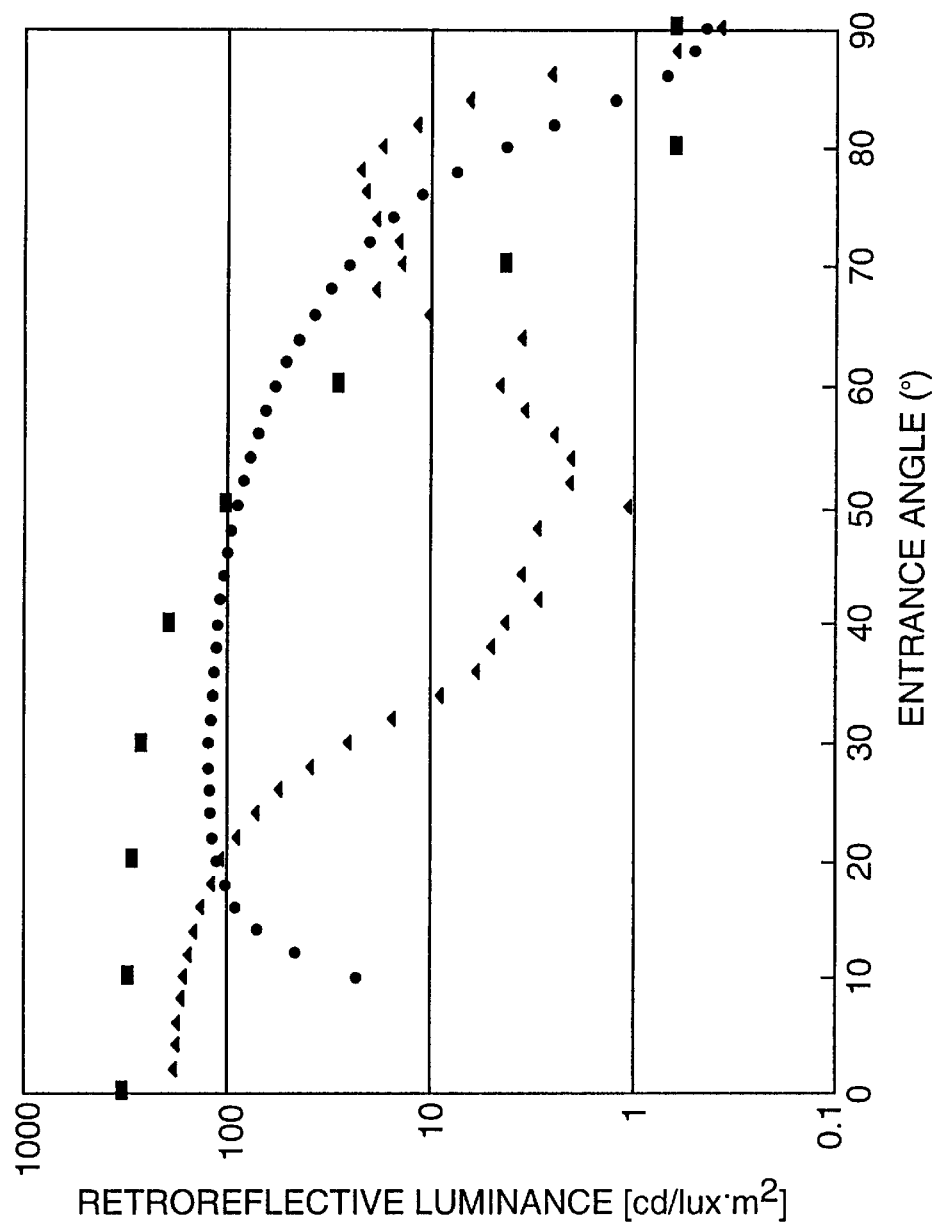
FIG. 4 is a graph comparing the retroreflective luminance as a function of entrance angle for various sheeting constructions.

The retroreflective luminance was measured for the reference example for the background portions (i.e. for the portion of the retroreflective sheeting not covered by either imaging element A or B), for imaging element A, and for imaging element B, according to method JIS Z 9117, with light incident on the sample at an entrance angle varying between 0 and 90° in a plane perpendicular to the prism axes of the prismatic sheeting. The detector was separated from the light source by a constant observation angle of 0.2°. The results are shown in FIG. 4, where squares plot the data for the background portions, triangles plot the data for imaging element A, and circles plot the data for imaging element B. As shown, both imaging element A and B have higher retroreflective luminance than the retroreflective sheeting alone at high entrance angles, in particular, at about 70° or higher. Furthermore, the dependency of retroreflective luminance on the entrance angle is different for imaging elements A and B.

Example 1

The prismatic sheeting was cut to obtain indicia in the form of Japanese language characters for "Curve Ahead, Slow Down". An adhesive was prepared by coating a composition of 99.375 wt. parts of an adhesive polymer (isooctylacrylate-acrylic acid copolymer) and 0.625 wt. parts of a bisamide crosslinking agent on a silicone-treated release paper and drying the composition at about 80° C. to form a continuous adhesive layer. A prismatic sheeting was laminated to the adhesive layer with the flat surface of the prismatic sheeting in contact with the adhesive, at a pressure of about 1.5 kg/cm$^2$. This layered combination was cut to obtain indicia in the form of Japanese language characters for "Curve Ahead, Slow Down". The release paper was removed and the indicia were applied to the front surface of a retroreflective sheeting with prismatic axes of all the characters in parallel alignment.

An image-displaying system was assembled by combining the image-displaying sheeting and a floodlight, and placed outdoors. The sheeting was mounted vertically with respect to the ground such that the prismatic axes were directed vertically upwards. The image "Curve Ahead, Slow Down" was illuminated at night with the floodlight, gradually changing the entrance angle from 0 to about 90°, and observed at a constant observation angle of about 0.2° degrees. The image was clearly seen in the whole entrance angle range, and the visibility was rated as "good". In particular, at the entrance angle range of about 70° or higher, the luminance of the characters was higher than that of the background portions of the retroreflective sheeting, and the characters were sharply read. The floodlight used was an automobile headlamp, and the distance from the light source to the sheeting was maintained at about 10 m for all the entrance angles measured.

For comparison, the same characters were printed on the front surface of the same type of retroreflective sheeting without using any prismatic sheeting, and observed under the same conditions. In this case, the retroreflective luminance decreased at the entrance angle of about 70° or higher, and the characters were difficult to read, as in the case of conventional image-displaying sheets.

Example 2

An image-displaying sheeting was prepared in the same manner as that of Example 1 except that 0.500 wt. parts of a red fluorescent dye (LUMOGEN Red 300, available from BASF) was added to the adhesive composition. The sheeting was observed in the same fashion as that of Example 1. The visibility of the image was rated "good". In particular, at entrance angles of about 70° or higher, the retroreflective luminance of the characters was higher than that of the background portions, and the characters were sharply read. In addition, the visibility of the image was also good in the daytime and at twilight, since the adhesive contained the fluorescent dye.

Example 3

An image-displaying sheeting was prepared in the same manner as Example 1 except that a different type of retroreflective sheeting was used. Upon inspection in the manner discussed above, the visibility of the image was rated "good". At entrance angles of about 70° or higher, the retroreflective luminance of the characters was higher than that of the background portions, and the characters were sharply read.

Example 4

An image-displaying sheeting was prepared in the same manner as Example 1 except that a different type of retroreflective sheeting was used. Upon inspection in the manner discussed above, the visibility of the image was rated "good". At entrance angles of about 65° or higher, the retroreflective luminance of the characters was higher than that of the background portions, and the characters were sharply read.

Example 5

An image-displaying sheeting was prepared in a similar manner to Example 1 except that the imaging element used a discontinuous adhesive layer and the prismatic surface of the prismatic sheeting faced down towards the retroreflective sheeting. Partial adhesion of the adhesive to the neighboring members was achieved using a honeycomb structure adhesive layer, consisting of a plurality of hexagons (the length of each segment being about 3 mm) of the adhesive, and was formed by silk-screen printing of the adhesive composition used in Example 1. The thickness of the adhesive layer was about 20 µm, and the width of each segment of the hexagons was about 40 µm. The adhesive layer was covered with a release paper until the indicia-shaped prismatic sheeting was applied to the retroreflective sheeting.

Upon inspection in the manner discussed above, the visibility of the image was rated "good". In particular, in the entrance angle range from about 40° to 80°, the retroreflective luminance of the characters was higher than that of the background portions, and the characters were sharply read.

Example 6

An image-displaying sheeting was prepared in the same manner as that of Example 5, except that the adhesive composition of Example 2 was used as an adhesive. Upon inspection in the manner discussed above, the visibility of the image at night, in the daytime, and at twilight was rated "good". In particular, in the entrance angle range of about 40° to 80°, the retroreflective luminance of the characters was higher than that of the background portions, and the characters were sharply read.

Example 7

An image-displaying sheeting was prepared in the same manner as Example 5 except that a different type of retroreflective sheeting was used. Upon inspection in the manner discussed above, the visibility of the image was rated "good". In particular, at entrance angles between about 60° and 85°, the retroreflective luminance of the characters was higher than that of the background portions, and the characters were sharply read.

Example 8

An image-displaying sheeting was prepared in the same manner as Example 5 except that a different type of retroreflective sheeting was used. Upon inspection in the manner discussed above, the visibility of the image was rated "good". In particular, at entrance angles between about 50° and 90°, the retroreflective luminance of the characters was higher than that of the background portions, and the characters were sharply read.

Example 9

An image-displaying sheeting was prepared in the same manner as Example 1, except that the characters for "SLOW DOWN" were formed using the imaging element construction of Example 5 (prismatic surface facing down). The characters for "CURVE AHEAD", formed in the same manner as in Example 1, are referred to as imaging element (A) and the characters for "SLOW DOWN" are referred to as imaging element (B).

Upon inspection in the manned described, the visibility of the image (both imaging elements (A) and (B)) was rated "good". The appearance of the characters changed as a function of entrance angle. The imaging element (A) was more clearly seen than imaging element (B) in the entrance angle range of between 0° and about 10°, and of about 75° or higher, while the imaging element (B) was more clearly seen than imaging element (A) in the entrance angle range from about 25° to about 70°.

Example 10

An image-displaying sheeting was prepared in the same manner as Example 9, except that a different type of retroreflective sheeting was used. Upon inspection in the usual manner, the visibility of the image (both imaging elements (A) and (B)) was rated "good". The appearance of the characters changed depending on the entrance angle in like fashion to Example 9.

Example 11

An image-displaying sheeting was prepared in the same manner as Example 9, except that a different type of retroreflective sheeting was used. Upon inspection in the usual manner, the visibility of the image (both imaging elements (A) and (B)) was rated "good". The appearance of the characters changed depending on the entrance angle in like fashion to Example 9.

Example 12

On the front surface of a retroreflective sheeting, a colored layer consisting of the Japanese language characters for "CURVE AHEAD, SLOW DOWN" was formed by screen printing the characters with a printing ink for road signs ("1000 Series" ink available from 3M Company) using a 150 mesh plate. One imaging element (designated "A") was then completed by applying one 15 cm×15 cm square of prismatic sheeting, having pieces of double-coated adhesive tape (see Reference Example) on the respective four corners thereof, over the characters for "CURVE AHEAD". Another imaging element (designated "B") was completed by applying one 15 cm×15 cm square of prismatic sheeting, having pieces of double-coated adhesive tape (see Reference Example) on the respective four corners thereof, over the characters for "SLOW DOWN". The adhesive layer contacted the flat surface of the prismatic sheeting for imaging element A and contacted the prismatic surface for imaging element B, so that the former had the prismatic surface facing away from the retroreflective sheeting and the latter had the prismatic surface facing towards the retroreflective sheeting.

Upon inspection in the usual manner, the visibility of the image (both imaging elements (A) and (B)) was rated "good". The appearance of the characters changed depending on the entrance angle.

Examples 13, 14

Image-displaying sheets were prepared in the same manner as Example 12, except that different types of retroreflective sheeting were used as shown in Table 1. Upon inspection in the usual manner, in both cases, the visibility of the image (both imaging elements (A) and (B)) was rated "good". The appearance of the characters changed depending on the entrance angle.

Example 15

An image-displaying sheeting was prepared in the same manner as Example 12, except that: (1) the colored layer was formed using a Scotchprint™ brand computer aided electrostatic printing system (available from 3M Company); (2) a graphic design was used instead of the linguistic characters; and (3) only the prismatic sheeting and adhesive layer construction of imaging element (A) of Example 12 was used.

Upon inspection in the usual manner, the visibility of the image was rated "good". The details of the graphic design were seen well, since the design was printed on the flat front surface of the retroreflective sheeting. Also, the design was clearly seen at high entrance angles of about 70° or higher, since the prismatic surface of the imaging element faced away from the retroreflective sheeting.

Example 16

An image-displaying sheeting was prepared in the same manner as Example 1 except that the colored layer of Example 15 (shaped in the form of a graphic design) was formed on the flat front surface of the retroreflective sheeting, and the character-shaped prismatic sheetings of Example 1 were laminated on top of the colored layer. Upon inspection in the usual manner, the graphic design was seen more clearly than the characters when the entrance angle was low, while only the characters were seen when the entrance angle was high (about 60° or higher). Thus, the characters formed by the prismatic sheeting operated as hidden characters.

Example 17

An image-displaying sheeting was prepared in the same manner as Example 12, except that imaging element (A) thereof was modified by using the indicia-shaped prismatic sheetings of Example 1 rather than the 15 cm×15 cm piece of prismatic sheeting. These indicia-shaped prismatic sheetings were laminated in registration with the corresponding screen-printed characters for "CURVE AHEAD". The imaging element (B) was the same as that of Example 12.

Upon inspection in the usual manner, the visibility of the image was rated "good". The appearance of the characters changed depending on the entrance angle.

GLOSSARY OF SELECTED TERMS

"Datum Mark" means a mark (whether real or hypothetical) on a reflective article that is used as a reference to indicate orientation about the reference axis.

"Entrance Angle" ($\beta$) means the angle between the illumination axis and the reference axis.

"Entrance Half-Plane" means a half-plane which originates on the reference axis and contains the illumination axis.

"Illumination Axis" means a line segment extending between the reference center and the source of illumination.

"Image" refers to indicia (for example, linguistic characters, symbols, numbers, graphics) configured to convey information.

"Observation Angle" ($\alpha$) means the angle between the illumination axis and the observation axis.

"Observation Axis" means a line segment extending between the reference center and a selected observation point.

"Observation Half-Plane" means a half-plane that originates on the illumination axis and contains the observation axis.

"Orientation Angle" (ω) means the dihedral angle between the entrance half-plane and a half-plane originating on the reference axis and containing the datum mark.

"Presentation Angle" (γ) means the dihedral angle between the entrance half-plane and the observation half-plane.

"Reference Axis" means a line segment extending from the reference center away from the reflective article, and which is ordinarily perpendicular to the reflective article at the reference center.

"Reference Center" means a point on or near a reflective article which is designated to be the center of the article for specifying its performance.

"Retroreflective" means having the characteristic that obliquely incident incoming light is reflected in a direction antiparallel to the incident direction, or nearly so, such that an observer at or near the source of light can detect the reflected light.

"Retroreflective Luminance" refers to the apparent brightness of an article, i.e., the reflected luminous intensity of the article divided by the normal illuminance of the source of illumination and by the surface area of the article, expressed in candelas per lux per square meter and abbreviated cd/(lx·m$^2$) or cd/lx/m$^2$. For light outside of the visible spectrum, corresponding quantities expressed in radiometric rather than photometric terms. Retroreflective luminance assumes the observer is located very close to the source of illumination, typically 0.2° observation angle.

"Structured" when used in connection with a surface means a surface that has a plurality of distinct faces arranged at various orientations.

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. An image-displaying sheeting comprising a retroreflective sheeting and an imaging element disposed on a front surface of the retroreflective sheeting, the imaging element comprising:

a light-transmitting prismatic sheeting having a surface provided with a plurality of parallel prisms; and an adhesive layer that adheres the prismatic sheeting to the front surface of the retroreflective sheeting;

wherein at least a portion of the imaging element is shaped in the form of indicia.

2. The sheeting of claim 1, wherein the prismatic sheeting is shaped in the form of indicia.

3. The sheeting of claim 2, wherein the adhesive layer is discontinuous and contacts the surface provided with the plurality of parallel prisms.

4. The sheeting of claim 2, wherein the prismatic sheeting has a substantially flat surface opposite the surface provided with the plurality of parallel prisms.

5. The sheeting of claim 4, wherein the adhesive layer contacts the flat surface of the prismatic sheeting.

6. The sheeting of claim 1, wherein the front surface of the retroreflective sheeting is substantially flat.

7. The sheeting of claim 1, wherein the imaging element comprises a light-transmitting colored layer.

8. The sheeting of claim 7, wherein the light-transmitting colored layer is shaped in the form of indicia.

9. The sheeting of claim 8, wherein the colored layer contacts the front surface of the retroreflective sheeting, and the adhesive layer adheres the prismatic sheeting to the colored layer.

10. The sheeting of claim 9, wherein the prismatic sheeting is also shaped in the form of indicia.

11. The sheeting of claim 10, wherein the prismatic sheeting is in registration with the colored layer.

12. The sheeting of claim 1, wherein a plurality of indicia are arranged parallel to a first axis, and each of the prisms extend parallel to a second axis different from the first axis.

13. The sheeting of claim 12, wherein the second axis is substantially perpendicular to the first axis.

14. An image-displaying system comprising the sheeting of claim 1 and a stationary light source positioned to illuminate the sheeting.

15. The image-displaying system of claim 14, wherein the parallel prisms extend parallel to a prism axis, and wherein the light source is disposed proximate to a viewing plane oriented perpendicular to the prism axis.

16. The image-displaying system of claim 14, wherein the surface of the prismatic sheeting faces away from the front surface of the retroreflective sheeting, and wherein the light source is disposed relative to the image-displaying sheeting at an entrance angle from about 20 to about 80 degrees.

17. The image-displaying system of claim 14, wherein the surface of the prismatic sheeting faces towards the front surface of the retroreflective sheeting, and wherein the light source is disposed relative to the image-displaying sheeting at an entrance angle from about 60 to about 90 degrees.

* * * * *

UNITED STATES PATENT AND TRADEMARK OFFICE
CERTIFICATE OF CORRECTION

PATENT NO. : 6,048,069 Page 1 of 1
DATED : April 11, 2000
INVENTOR(S) : Nagaoka Yoshiyuki It is certified that error appears in the above-identified patent and that said Letters Patent is hereby corrected as shown below:

<u>Title page,</u>
Item [73], Assignee, please delete "Minn." and insert in place thereof -- MN (US) --.

<u>Column 2,</u>
Lines 25 and 28, delete "comer" and insert in place thereof -- corner --.

<u>Column 4,</u>
Line 23, delete "comer" and insert in place thereof -- corner --.

<u>Column 5,</u>
Line 41, delete "plan" and insert in place thereof -- plain --.

<u>Column 7,</u>
Line 19, delete "comer" and insert in place thereof -- corner --.

<u>Column 9,</u>
Line 50, under the heading "Beaded, encapsulated lens, Line 12 (A&B) (3M type 3870)" insert -- X --.

<u>Column 10,</u>
Line 31, delete "comers" and insert in place thereof -- corners --.

<u>Column 13,</u>
Line 4, delete "manned" and insert in place thereof -- manner --.
Line 47, delete "comers" and insert in place thereof -- corners --.

Signed and Sealed this

Eighth Day of July, 2003

JAMES E. ROGAN
*Director of the United States Patent and Trademark Office*